United States Patent
Kekki et al.

(10) Patent No.: US 7,292,839 B2
(45) Date of Patent: Nov. 6, 2007

(54) MACRODIVERSITY SYSTEM WITH SIGNAL COMBINING IN THE BASE STATION

(75) Inventors: Sami Kekki, Helsinki (FI); Fabio Longoni, Malaga (ES)

(73) Assignee: Nokia Corporation, Espoo (FI)

( * ) Notice: Subject to any disclaimer, the term of this patent is extended or adjusted under 35 U.S.C. 154(b) by 531 days.

(21) Appl. No.: 10/240,941

(22) PCT Filed: Apr. 5, 2001

(86) PCT No.: PCT/EP01/03885

§ 371 (c)(1),
(2), (4) Date: Mar. 26, 2003

(87) PCT Pub. No.: WO01/78436

PCT Pub. Date: Oct. 18, 2001

(65) Prior Publication Data

US 2003/0157921 A1  Aug. 21, 2003

(30) Foreign Application Priority Data

Apr. 7, 2000 (GB) ................... 0008689.2

(51) Int. Cl.
*H04M 11/00* (2006.01)
*H04Q 7/00* (2006.01)

(52) U.S. Cl. .................... 455/403; 370/331

(58) Field of Classification Search ........... 455/442, 455/436, 445, 437, 414, 438, 443, 456.6, 455/453, 403, 560, 524, 422, 503, 525, 460; 342/357.1; 370/331, 345

See application file for complete search history.

(56) References Cited

U.S. PATENT DOCUMENTS

| | | | |
|---|---|---|---|
| 6,021,125 A * | 2/2000 | Sakoda et al. | 370/345 |
| 6,038,458 A | 3/2000 | Siira | |
| 6,108,547 A | 8/2000 | Yamashita et al. | |
| 6,603,976 B1 * | 8/2003 | Amirijoo et al. | 342/357.1 |
| 6,760,587 B2 * | 7/2004 | Holtzman et al. | 455/436 |
| 6,760,588 B2 * | 7/2004 | Okajima et al. | 455/437 |
| 6,782,277 B1 * | 8/2004 | Chen et al. | 342/359 |
| 2001/0034233 A1 * | 10/2001 | Tiedemann, Jr. et al. | 455/436 |

FOREIGN PATENT DOCUMENTS

| | | |
|---|---|---|
| EP | 0 645 940 A | 3/1995 |
| WO | WO 94/01975 A | 1/1994 |
| WO | WO 00/11899 A | 3/2000 |

\* cited by examiner

*Primary Examiner*—Naghmeh Mehrpour
(74) *Attorney, Agent, or Firm*—Squire, Sanders & Dempsey L.L.P.

(57) ABSTRACT

A method for processing signals in a communications system comprising a first station and a plurality of second stations, said method comprising the steps of receiving at said plurality of second stations signals from said first station; sending said received signals to a designated one of said plurality of second stations; and processing in said designated second station the signals received by plurality of second stations to provide a single signal.

18 Claims, 3 Drawing Sheets

MACRODIVERSITY SYSTEM WITH SIGNAL COMBINING IN THE BASE STATION

FIELD OF THE INVENTION

The present invention relates to a method and system for processing signals, in particular but not exclusively, in a wireless telecommunications system.

BACKGROUND TO THE INVENTION

The use of code division multiple access (CDMA) is being proposed for the next generation of cellular telecommunication networks. Additionally, code division multiple access is also being used in the IS-95 standard in the USA. CDMA is a direct sequence spread spectrum technique. In a wireless cellular network using CDMA, the mobile stations in one cell associated with a first base station will use the same frequency as mobile stations in an adjacent cell associated with the second base station. The different mobile stations can be distinguished by the respective base stations as each mobile station will be using a different spreading code.

Soft handover has been proposed in relation to CDMA systems. With soft handover, a mobile station is arranged to communicate with more than one base station at the same time. In particular, the same signals are sent to the mobile station from the various base stations and are combined in the mobile station. Likewise, the signals transmitted by the mobile station are received by the different base stations. The signals received by the different base stations are forwarded to a further network element which combines the signals received by the base stations. This is a cumbersome process in that the network element has to process the signals received from the base stations and also ensure that the signals are received by all the base stations for transmission to the mobile station. In more detail a major problem is the delay introduced by having an interface between the network element that processes the data and the base stations which receive the signals. In addition in some cases the required transmission capacity to convey these signals over the network between the base stations and the network element which processes the signals may cause problems.

SUMMARY OF THE INVENTION

It is an aim of embodiments of the present invention to address these problems of the known arrangement.

According to one aspect, there is provided a method for processing signals in a communications system comprising a first station and a plurality of second stations, said method comprising the steps of receiving at said plurality of second stations signals from said first station; sending said received signals to a designated one of said plurality of second stations; and processing in said designated second station the signals received by plurality of second stations to provide a single signal.

By carrying out the combining low in the network hierarchy (for example, in the base stations) some transmission savings may be obtained. It should be appreciated that a mobile switching centre is relatively high in a network hierarchy whilst a base station is relatively low.

Preferably, the communications system comprises a control node.

Preferably, the method comprises the step of sending from the control node to the designated second station a request requesting the designated second station set up a connection. The request may include information that a connection is to be set up between the first station and at least one other station. A connection may be set up between the designated first station and the control node. Identity information may be allocated to said connection. The identity information may be sent to the control node.

The communication system may comprise a fixed node. The method embodying the present invention may comprise the step of setting up a connection between the fixed node and said designated second station. The step of setting up a connection between the designated second station and the first station is preferably done before a connection is set up between the or each second station.

The method may comprise a step of sending a request from the control node to the or each other second station that the or each other second station establish a connection. The request may comprise information relating to the designated second station. The method may comprise the step of setting up a connection between the designated second station and the or each other second station.

Preferably, the method comprises the step of the designated second station sending data for the first station to the or each other second station, the designated second station and the or each other second station sending said data to the first station.

The first station may be a mobile station and the plurality of second stations may be base stations.

According to a second aspect of the present invention, there is provided a communications system comprising a first station and a plurality of second stations, each of said second stations being arranged to receive the same signals from the first station, one of said second stations being arranged to receive from the or each other second station the signals received from the first station, said one second station comprising processing means for processing the signals received by plurality of second stations.

According to a third aspect of the present invention, there is provided a second station for use in a communications system comprising a first station and a plurality of second stations, each of said second stations being arranged to receive the same signals from the first station, said second station comprising first means for receiving the signals from the first station; second means for receiving from the or each other second station the signals received from the first station; and processing means for processing the signals received by the first and second means to provide a single signal.

According to a fourth aspect of the present invention, there is provided a method for processing signals in a communications system comprising a first station and a plurality of second stations, said method comprising the steps of receiving at said plurality of second stations signals from said first station; sending said received signals directly from said second stations to a processor; and processing in said processor the signals received by plurality of second stations.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE INVENTION

Figure 1:
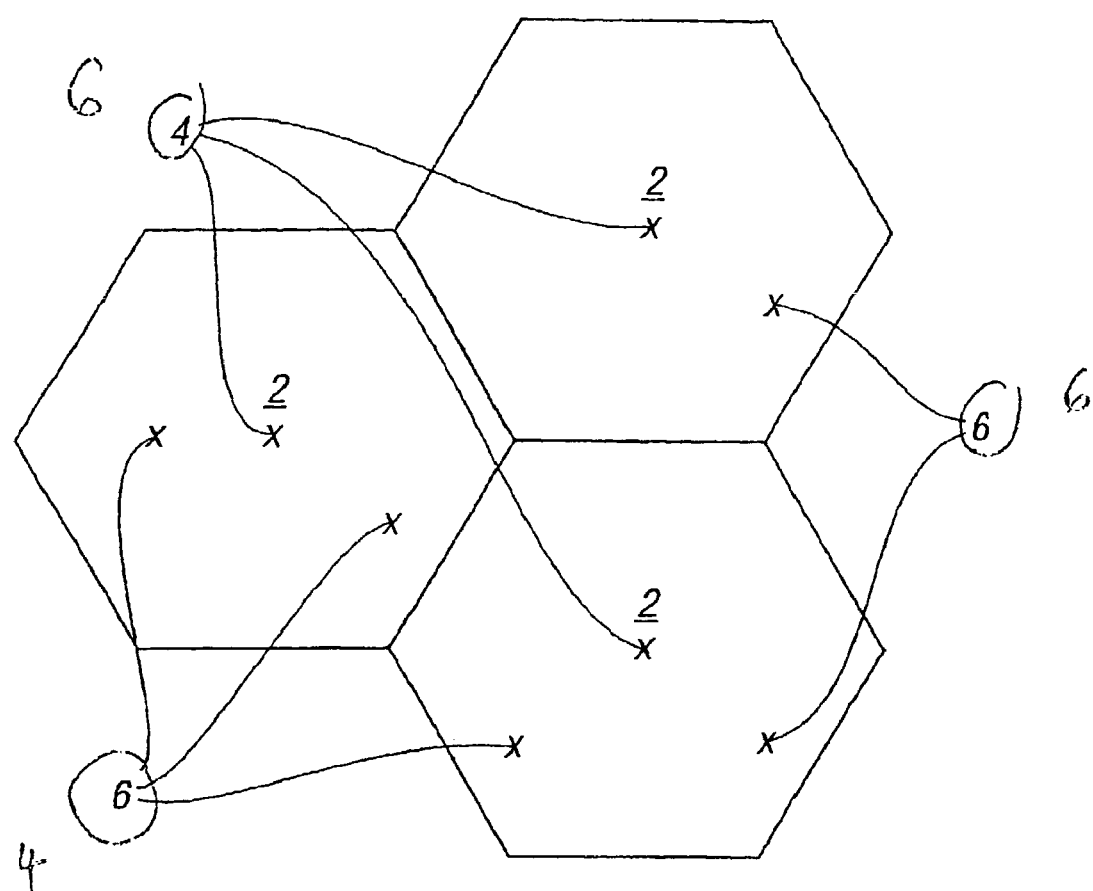
FIG. 1 shows a cellular telecommunication network in which embodiments of the present invention can be incorporated

Reference will first be made to FIG. 1 in which three cells 2 of the cellular telecommunications network are shown. Each cell 2 is served by a respective base transceiver station (BTS) 4. Each base transceiver station is arranged to transmit signals to and receive signals from the mobile stations 6 located in the cell associated with the given base transceiver station 4. Likewise, each mobile station 6 is able to transmit signals to and receive signals from the respective base transceiver station 4.

The embodiment of the invention is described in the context of a code division multiple access system. However it should be appreciated that embodiments of the present invention can be used with other types of multiple access system such as time division multiple access, other spread spectrum techniques, frequency division multiple access as well as hybrids of one or more of the access techniques discussed above.

With the proposed new CDMA standard, macrodiversity is possible. This means that a mobile station can be connected to more than one base station at the same time.

Figure 2:
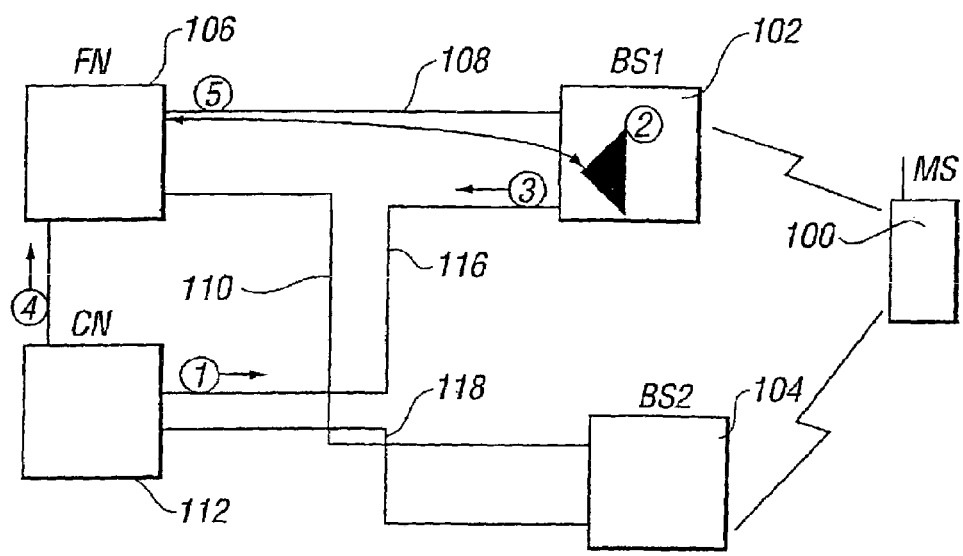
FIG. 2 shows an embodiment of the invention where a first set of procedures have been completed.
Figure 3:
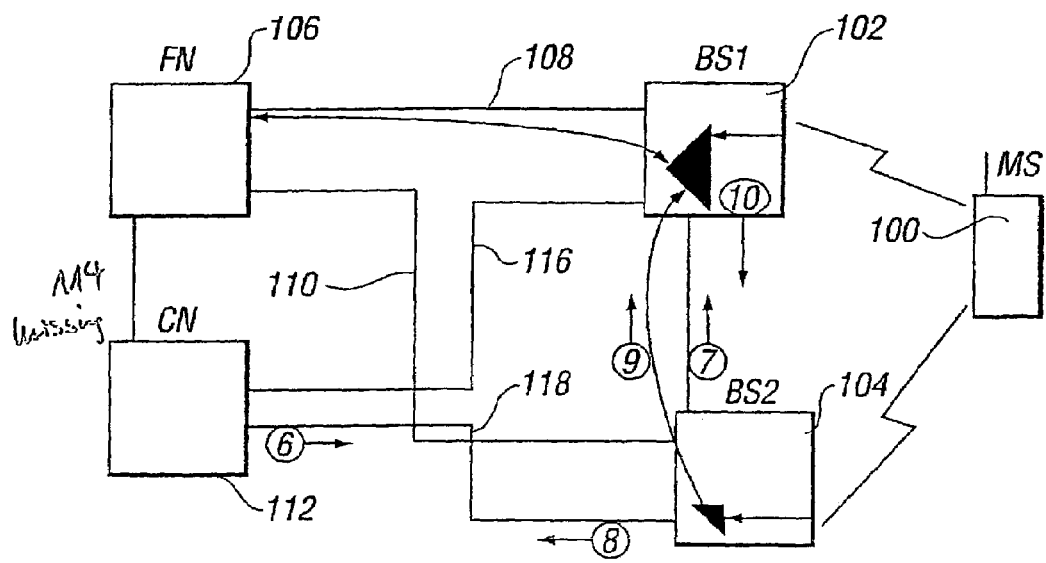
FIG. 3 shows the embodiment of FIG. 2, where a second set of procedures have been completed.
Figure 4:
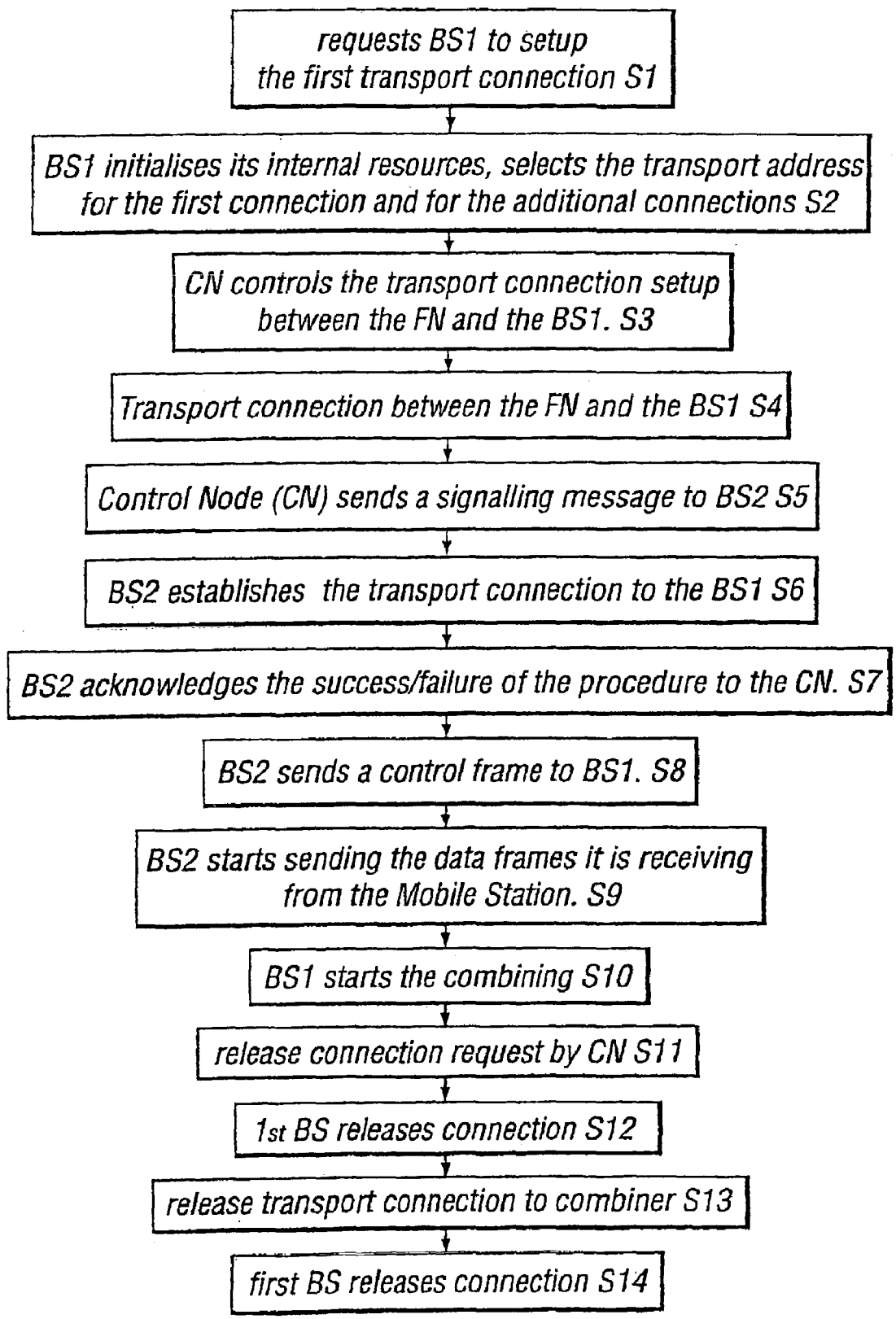
FIG. 4 is a flow diagram illustrating one method embodying the invention.

Reference is made to FIGS. 2 to 4. The arrangement of FIGS. 2 and 3 comprises a mobile station MS 100 which is arranged to communicate with a first base station BS1 102 and a second base station BS2 104. The first base station is connected to a fixed node FN 106 via a terrestrial communication link 108. The fixed node FN 106 is also connected to the second base station BS2 104 again via a terrestrial communication link 110. The terrestrial link takes the form of a wired connection or a wireless connection.

In the embodiment shown on FIGS. 2 to 4, the base stations 102 and 104 each include a macrodiversity combiner 130. However in alternative embodiments of the present invention, not all base stations are provided with a macrodiversity combiner. In another alternative embodiment of the invention the macrodiversity combiner is separate from the base stations. It should be appreciated that some embodiments of the invention may use one or more of these possibilities in the same network.

A control node CN 112 is provided which has links 114-8 to the fixed node 106, the first base station 102 and the second base station 104 respectively. The control node 112 is arranged to control and set up the various connections, as will be described in more detail hereinafter.

Embodiments of the invention are used where the macrodiversity combining (MDC) and soft handover (SHO) are performed in one of the base stations involved in the corresponding call(s). Soft handover occurs when a mobile station is in communication with two or more base stations at the same time. The base stations will each receive the signals from the mobile station. The signals received by the base stations are combined (macrodiversity combining) to provide the best possible signal for further analysis. The mobile station will also receive the same signals from each of the base stations. The signals received from the different base stations are also combined in the mobile station.

The second base station BS2 104 is used for the soft handover connection, that is to transmit and receive the same data as the first base station BS1 102. As will be described in more detail hereinafter, the combining and splitting of the data stream is performed in the first base station BS1. A connection between the first base station BS1 and the second base station BS2 is established.

The first set of procedural steps of a first phase will now be described with reference to FIGS. 2 and 4.

In the first step S1, the control node CN 112 sends a signalling message to the first base station. This message requests that the first base station BS1 102 setup a first transport connection and a corresponding radio bearer, that is a radio resource connection. The transport connection is the connection between the control node and the base station. The radio bearer is the connection between the control node and the mobile station. In the request, the control node CN indicates that there is a possibility that at least one other connection between a different base station and the mobile station may be setup later on. The connection may include the maximum number of additional base stations that may be used later on. The information may also include the identity of the base stations. However in preferred embodiments of the invention, the request only indicates that there is a possibility that a mobile station will be in communication with more than one base station. In other words soft handover may occur later on. This at least one other connection is associated with the first one. This will result in the need for macrodiversity combining MDC.

In step S2, the first base station BS1 102, upon receiving the request from the control CN, initialises its internal resources. The first base station also selects in the macrodiversity combiner the transport address for the first connection and for the at least one other connection. As mentioned previously, the macrodiversity combiner can be either internal to the first base station, or external to the first base station and connected to the base station BS via a transport and/or control connection. The transport address is the address of the macrodiversity combiner 130, that is, a specific port of the macrodiversity combiner 130 to be used when sending data to the macrodiversity combiner. A binding identifier is also assigned for each transport connection. The binding identifier identifies the transport connection between the control node and the first base station.

In step S3, the first base station BS1 sends an acknowledgement to the control node CN indicating the success/failure of the requested connection setup. In the acknowledgement message the transport addresses of the macrodiversity combiner are included as well as the binding identifiers for each of the transport connections.

In step S4, the control node CN controls the transport connection setup between the fixed node FN 106 and the macrodiversity combiner. The transport address and the corresponding binding identifier (that is the transport address and the binding ID that were received from the first base station BS1 in its acknowledgement) are used in the transport bearer setup between the fixed node FN and the macrodiversity combiner of the first base station BS1.

In step S5, after the successful setup there is a transport connection between the fixed node FN 106 and the macrodiversity combiner 130 of the first base station BS1 102. In the macrodiversity combiner 130 of the first base station BS1 the termination of the connection takes place in the resource that was addressed by the given transport address and binding identifier.

The second set of procedures will now be described with reference to FIG. 3 and 4.

In step S6, the control node CN 112 sends a signalling message to the second base station BS2 104, requesting the second base station BS2 104 to setup a transport connection and a corresponding radio bearer connection. In the request the transport address and binding identity of the macrodiversity combiner 130 of the first base station BS1 102 are included.

In step S7, the second base station BS2 104 establishes the transport connection with the first base station BS1 102, towards the given transport address of the macrodiversity combiner 130 of the first base station. The binding identity is included in the message.

In step S8, the second base station BS2 104 sends a message to the control node which indicates if the procedure has been successful or not.

If the procedure has been successful, in step S9, the second base station BS2 sends a control frame to the macrodiversity combiner 130 of the first base station BS1 in the newly established transport bearer indicating the activation of the new soft handover branch. After that the second base station BS2 starts sending to the macrodiversity combiner 130 of the first base station the data frames it receives from the mobile station.

In step S10, after receiving the control frame or the first uplink UL data frame from the mobile station, the macrodiversity combiner 130 of the first base station BS1 starts the combining of the data frames received from the mobile station. The data frames will be received by the first base station and the second base station and these data frames are combined by the macrodiversity combiner 130 of the first base station The macrodiversity combiner 130 of the first base station also forwards the data frames received from the fixed node FN to the first and second base station. To do this the macrodiversity combiner needs to copy the received downlink frames before forwarding them. In this way, both the first and second base stations transmit the same data frames to the mobile station.

If there are more than two base stations involved in the soft handover, the same procedure outlined above will be used to establish connections with the further base stations.

The third stage of the procedure will now be described. In the third stage, the radio connection between the first base station BS1 and the mobile station is released, without releasing the macrodiversity combiner so that the traffic is going via macrodiversity unit of the first base station BS1 to the second base station. Then the macrodiversity combiner is released.

In step S11, the control node CN sends a signalling message to the first base station BS1 asking for the release of the connection between first base station BS1 and the mobile station. The message clearly indicates that the connection between the macrodiversity combiner 130 of the first base station and the fixed node FN and between the combiner 130*t* and all the other base stations shall not be released.

In step S12, first base station BS1 releases the radio connection and sends an acknowledgment to the control node CN node. The transport connections to/from the combiner of the first base station are not released.

In step S13, the control node CN sends a signalling message to the first base station BS1 asking that one or all the transport connections to/from the combiner of the first base station BS1 to the fixed node FN be released.

In step S14, first base station BS1 releases the connection and sends an acknowledgement to the control node CN.

Step S11 and S13 can be done simultaneously with the same signalling message.

It should be appreciated that in the context of the present document, the term combining refers to any possible combining/selection procedure of the data coming from the two or more sources. Macrodiversity combining is well known and any of the known techniques may be used in embodiments of the present invention. For example, the signals can simply be combined, the strongest signal selected, the n strongest signals selected and combined or the signals to be can be combined with different weights. The combiner does not necessarily combine signals. The term combining should therefore be broadly construed to mean the obtaining of signals from two or more sources, the processing of the signal in any way in order to provide a single signal.

The transport bearer setup and release in the procedure above can be done in the ATM/AAL2 (ATM adaption layer type 2) environment by using the AAL2 signalling protocol as it has been specified in the ITU-T recommendation Q.2630 (AAL2 Type 2 Signalling Protocol). In case of IP (Internet protocol) transport technology there may not be any explicit setup procedure but the IP datagrams are sent as self-contained units conveying the address information in the datagram header. There are both the destination IP address (e.g., in step 9 the address of the BS1 that was given by the first base station BS1 at the initial acknowledgement towards the core node CN) and the originating IP address (e.g., in step 9 the address of the second base station BS2 where it wants the first base station BS1 to send the downlink data frames). On top of IP there may be UDP (user datagram protocol) and RTP (real time protocol) protocols. In this latter case, the binding identity can be either the UDP port number (16 bits, in each UDP header) or the RTP Source Identifier (32 bits, in each RTP header).

Embodiments of the invention are applicable to any suitable radio access network such as UTRAN (UMTS (Universal mobile telephone system) terrestrial radio access network) and GERAN (GPRS/EDGE radio access network), especially those with an IP (Internet protocol) based distributed architecture.

In the embodiment described hereinbefore, the term base station has been used. It should be appreciated that the base station may sometimes be referred to as Node B, depending on the standard involved. The term base station should therefore be construed widely to encompass any entity which provides the same, similar or equivalent function to a base station.

One proposal for a third generation system uses a UTRAN (UMTS (Universal mobile telephone system) terrestrial radio access network) architecture. In that architecture, the functionality of the fixed node and the control node are incorporated in the SRNC (serving radio network controller).

It should be appreciated that the link between the first base station and the fixed node and the second base station and the fixed node need not be a terrestrial telecommunications link. The links can take any suitable form. The links between the respective base stations and the fixed node can take different forms. Likewise, the link between the control node and the various elements can take any suitable form.

In the illustrated embodiment, the first and second base stations have been shown as being separated from the fixed node and the control node. In alternative embodiments of the present invention, some or all of the control node and/or the fixed node can be incorporated in one or both of the base stations. Likewise, some or all of the control node can be provided in the same element as some or all of the fixed node.

Whilst the present invention has referred to mobile stations, it should be appreciated that embodiments of the present invention are applicable to other types of user equipment, for example computer terminals These computer terminals may be fixed or mobile.

The invention claimed is:

1. A method for processing signals in a communications system, said method comprising:
providing a control node with information relating to a designated one of a plurality of second stations;
providing at least one other of said plurality of second stations with said information from the control node associated with the designated one of said second stations;
forming a connection between said designated one of said second stations and said at least one of said second stations using said information said forming of said connection being controlled by said control node;
receiving at said plurality of second stations signals from a first station;
sending said received signals from said at least one other of plurality of second stations to the designated one of said plurality of second stations by said connection; and
processing in said designated second station the signals received from said at least one other of plurality of second stations and the signals received at said designated second station to provide a single signal, and
processing signals in a communications system comprising the first station, the plurality of second stations and the control node.

2. A method as claimed in claim 1, further comprising: sending from the control node to the designated second station a request requesting the designated second station set up a connection.

3. A method as claimed in claim 2, wherein said request includes information that a connection is to be set up between the first station and at least one other second station.

4. A method as claimed in claim 1, further comprising: setting up a connection between said designated first station and said control node.

5. A method as claimed in claim 4, further comprising: allocating identity information to said connection.

6. A method as claimed in claim 5, further comprising: sending the identity information to said control node.

7. A method as claimed in claim 1, wherein said communication system comprises a fixed node.

8. A method as claimed in claim 7, further comprising: setting up a connection between said fixed node and said designated second station.

9. A method as claimed in claim 1, further comprising: setting up a connection between said designated second station and the first station before a connection is set up between the or each other second station.

10. A method as claimed in claim 1, further comprising: sending a request from the control node to the or each other second station that the or each other second station establish a connection.

11. A method as claimed in claim 10, wherein said request sent from the control node to the or each other second station comprises information relating to the designated second station.

12. A method as claimed in claim 1, further comprising: setting up a connection between the designated second station and the or each other second station.

13. A method as claimed in claim 1, further comprising: the designated second station sending data for the first station to the or each other second station, the designated second station and the or each other second station sending said data to said first station.

14. A method as claimed in claim 1, wherein said first station is a mobile station.

15. A method as claimed in claim 1, wherein said plurality of second stations are base stations.

16. A method as claimed in claim 1, wherein said processing step comprises combining said signals.

17. A communication system comprising a first station, the communication system comprising:
a plurality of second stations; and
a control node, the control node being configured to receive information relating to a designated one of said second stations, at least one other of said plurality of second stations being configured to receive said information from the control node associated with the designated one of said second stations, each of said second stations being configured to receive the same signals from the first station, the designated one of said second stations being configured to receive from the at least one other of said plurality of second stations the signals received from the first station on a connection formed between said designated one of said second stations and said at least one of said second stations using said information, said control node being further configured to control said forming of said connection, said designated one of said second stations comprising a processing unit configured to process the signals received from said at least one other of plurality of second stations and the signals received at said designated second station.

18. A second station for use in a communication system comprising a first station, a plurality of second stations and a control node, each of said second stations being arranged to receive the same signals from the first station, said second station comprising:
first receiving unit configured to receive the signals from the first station;
second receiving unit configured to receive a request from the control node, including an indication that there may be at least one other connection between the first station and one other station;
providing unit configured to provide the control node with information relating to the second station in response to the request;
fourth receiving unit configured to receive from the or each other second station, on a connection formed between the or each other second station using the information relating to the second station, the signals received from the first station; and
a processing unit configured to process the signals received by the third and second means to provide a signal.

* * * * *